(12) United States Patent
Takahashi et al.

(10) Patent No.: US 12,162,481 B2
(45) Date of Patent: Dec. 10, 2024

(54) MIRRORED VEHICLE INSPECTION DEVICE WITH GUIDED OPTICAL LASER DEVICE EMITTED LIGHT

(71) Applicants: MEIDENSHA CORPORATION, Tokyo (JP); National Agency for AUTOMOBILE and LAND TRANSPORT TECHNOLOGY, Tokyo (JP)

(72) Inventors: Toshimichi Takahashi, Ota (JP); Masao Nakagawa, Mitaka (JP)

(73) Assignees: MEIDENSHA CORPORATION, Tokyo (JP); NATIONAL AGENCY FOR AUTOMOBILE AND LAND TRANSPORT TECHNOLOGY, Tokyo (JP)

(*) Notice: Subject to any disclaimer, the term of this patent is extended or adjusted under 35 U.S.C. 154(b) by 0 days.

(21) Appl. No.: 18/282,726

(22) PCT Filed: Mar. 17, 2022

(86) PCT No.: PCT/JP2022/012305
§ 371 (c)(1),
(2) Date: Sep. 18, 2023

(87) PCT Pub. No.: WO2022/196766
PCT Pub. Date: Sep. 22, 2022

(65) Prior Publication Data
US 2024/0092353 A1    Mar. 21, 2024

(30) Foreign Application Priority Data
Mar. 19, 2021  (JP) ................. 2021-045406

(51) Int. Cl.
*G01M 17/00* (2006.01)
*B60W 30/09* (2012.01)
*G01L 5/28* (2006.01)

(52) U.S. Cl.
CPC ............... *B60W 30/09* (2013.01); *G01L 5/28* (2013.01); *G01M 17/00* (2013.01)

(58) Field of Classification Search
CPC .......... B60W 30/09; G01L 5/28; G01M 17/00
See application file for complete search history.

(56) References Cited

U.S. PATENT DOCUMENTS

2019/0204184 A1* 7/2019 Neumann ............. G01M 17/00
2019/0331482 A1  10/2019 Lawrence et al.
(Continued)

FOREIGN PATENT DOCUMENTS

JP    2000-206864 A    7/2000
JP    2016-061668 A    4/2016
(Continued)

*Primary Examiner* — Timothy P Graves
(74) *Attorney, Agent, or Firm* — Foley & Lardner LLP (57) ABSTRACT

A vehicle inspection device for implementing a test on automatic braking performance of a test vehicle including an optical laser device for obstacle detection, in an inspection room three sides of which are surrounded by side walls, the vehicle inspection device comprising: a test instrument disposed at a side of the test vehicle; and a mirror unit that covers an upper face of the test instrument and upwardly guides light emitted from the optical laser device. The mirror unit may include a combination of a first plane mirror part disposed horizontally and a second plane mirror part disposed to be inclined.

8 Claims, 6 Drawing Sheets

(56) References Cited

U.S. PATENT DOCUMENTS

2021/0287461 A1 9/2021 Matsuda
2022/0057481 A1* 2/2022 Aono .................. G01S 7/40

FOREIGN PATENT DOCUMENTS

| JP | 2017-097581 A | 6/2017 |
| WO | WO-2020/059472 A1 | 3/2020 |
| WO | WO-2020/059497 A1 | 3/2020 |

* cited by examiner

MIRRORED VEHICLE INSPECTION DEVICE WITH GUIDED OPTICAL LASER DEVICE EMITTED LIGHT

TECHNICAL FIELD

The present invention relates to a vehicle inspection device for implementing in an inspection room a test on automatic driving performance of a test vehicle including an optical laser device for obstacle detection.

BACKGROUND ART

Conventionally, vehicle inspection devices for an indoor test on a bench simulating a vehicle driving situation with a dynamometer have been provided for practical use. For example, Patent Document 2 discloses a vehicle inspection device structured to rotate driving wheels with a chassis dynamometer while rotating an axle of driven wheels with an axle driving device.

In recent years, it is desired to implement a bench test of a vehicle with an optical laser device for obstacle detection (e.g., a LiDAR device) on driving performance such as automatic braking performance when detecting an obstacle. In case that the optical laser device wrongly detects a surrounding test instrument as an obstacle, the vehicle presents a response such as an operation of automatic braking and becomes substantially unavailable for inspection.

Patent Document 1 discloses a vehicle inspection device including plate-like absorbers each of which closely faces a corresponding one of LiDAR devices disposed at a plurality of positions in a test vehicle in order to make the LiDAR devices recognize the test vehicle as if traveling on grassland with no obstacle.

In general, LiDAR devices use laser light short in wavelength as electromagnetic wave for measurement of a distance to an obstacle. Under current technology, any existing absorber fails to absorb 100 percent of such laser light used in LiDAR devices, and causes scattering of light to no small extent. The LiDAR devices of the vehicle inspection device in Patent Document 1 would detect scattering of light caused by the absorbers, because this vehicle inspection device is structured to interrupt optical paths of the LiDAR devices with use of the absorbers disposed closely to the LiDAR devices. Accordingly, the vehicle inspection device of Patent Document 1 would fail to actually prevent the LiDAR devices from wrongly detecting an obstacle.

Furthermore, the vehicle inspection device of Patent Document 1 is structured to cover the LiDAR devices with the absorbers, and would be unavailable for a test on emergency operation of the LiDAR devices: e.g., a test on automatic braking performance in case of sudden run-out of a pedestrian where an obstacle imitating the pedestrian is thrown into front of the test vehicle on a bench during a traveling test.

PRIOR ART DOCUMENT(S)

Patent Document(s)

Patent Document 1: WO 2020/059497 A1
Patent Document 2: JP 2016-061668 A

SUMMARY OF THE INVENTION

According to one aspect of the present invention, a vehicle inspection device for implementing a test on automatic braking performance of a test vehicle including an optical laser device for obstacle detection in an inspection room three sides of which are surrounded by side walls includes: a test instrument disposed at a side of the test vehicle; and a mirror unit that covers an upper face of the test instrument and upwardly guides light emitted from the optical laser device.

The optical laser device is, for example, a Light Detection and Ranging (LiDAR) device. However, it is not limited to that, but may be any device as long as structured to detect an obstacle by emitting and receiving laser light.

According to the above configurations, light emitted from the optical laser device toward the test instrument is reflected on the mirror unit and thereby directed upwardly. This prevents the optical laser device from detecting the test instrument as an obstacle.

According to a favorable aspect of the present invention, the mirror unit includes an inner peripheral edge that extends to face the test vehicle and is positioned at a height between the optical laser device and the test instrument, and includes an outer peripheral edge that extends to face the side walls and is positioned at a height higher than the optical laser device, and is curved or bent so as to guide light emitted from the optical laser device, toward a ceiling of the inspection room.

According to the above configurations, light reflected on the mirror unit is directed toward the ceiling. This increases optical paths in length, brings attenuation effect by distance, and prevents the optical laser device from detecting the test instrument as an obstacle even if slight scattering of light is caused on the ceiling.

According to another favorable aspect of the present invention, the ceiling of the inspection room includes an inner face covered by a light absorber. This causes the ceiling to absorb light hitting it, and thereby suppresses the light from returning to the optical laser device.

As an example, the optical laser device is covered from above by an intermediate ceiling wall hung between the test vehicle and the ceiling of the inspection room, and the intermediate ceiling wall includes an upper face covered by a light absorber. This suppresses light reflected on the ceiling from being incident on the optical laser device.

According to still another favorable aspect, the ceiling of the inspection room is open. This makes lengths of optical paths infinite, and eliminates scattering of light on the ceiling.

According to still another favorable aspect, the mirror unit is composed of a plurality of plane mirrors, although the mirror unit may be a curved mirror such as a parabola mirror or a spherical mirror focused on the optical laser device. The configuration of employing the combination of plane mirrors facilitates implementation of the present invention.

According to a specific example of the implementation, when viewed at a vertical cross section at one side of the test vehicle, the mirror unit includes a combination of: a first plane mirror part that includes the inner peripheral edge of the mirror unit and is disposed horizontally; and a second plane mirror part that includes the outer peripheral edge of the mirror unit and is disposed to be inclined. The configuration of employing the two plane mirror parts minimizes the number of boundaries or gaps between the plane mirror parts that are likely to be detected by the optical laser device.

More specifically, it is desirable that relations of $$W = L/2 * (1 + \cos(2*\theta 0))$$

$$Hd = L * (1 - \sin(2*\theta 0))/2$$

$$M = L * \sin \theta 0$$

are satisfied, where: L represents a height position of the outer peripheral edge of the mirror unit that is a sum Hs+a of a height position Hs of the optical laser device and a margin "a"; W represents a length of the first plane mirror part; Hd represents a height position of the first plane mirror part; M represents a length of the second plane mirror part; and θ0 represents an inclination angle of the second plane mirror part with respect to a vertical plane.

The satisfaction of the above relations causes light emitted from the optical laser light and reflected on the mirror unit to be directed toward the ceiling or positions on the side walls higher at least than the optical laser device. This eliminates optical paths to be reflected on the side walls and return to the optical laser device.

The test instrument may be, for example, a dynamometer structured to be connected to an axle of the test vehicle and measure a driving force.

The above aspects of the present invention serve to prevent the test instrument (e.g., the dynamometer) disposed at a side of the test vehicle including the optical laser device from being detected as an obstacle, and enable a test on automatic driving performance such as automatic braking with use of the optical laser device.

MODE(S) FOR CARRYING OUT THE INVENTION

The following details embodiments of the present invention.

Figure 1:
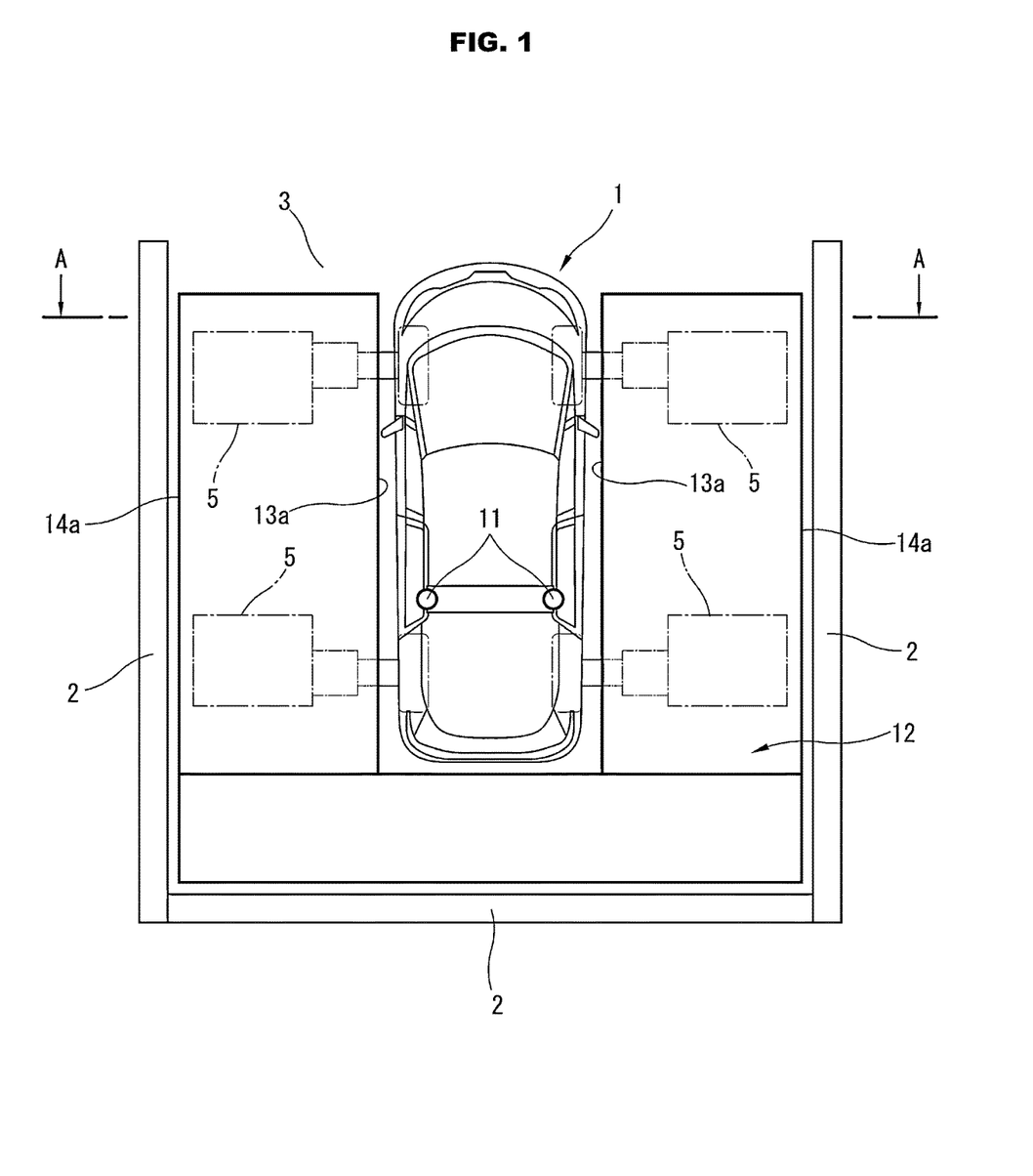
FIG. 1 is a plan view schematically showing configurations inside an inspection room according to a first embodiment.
Figure 2:
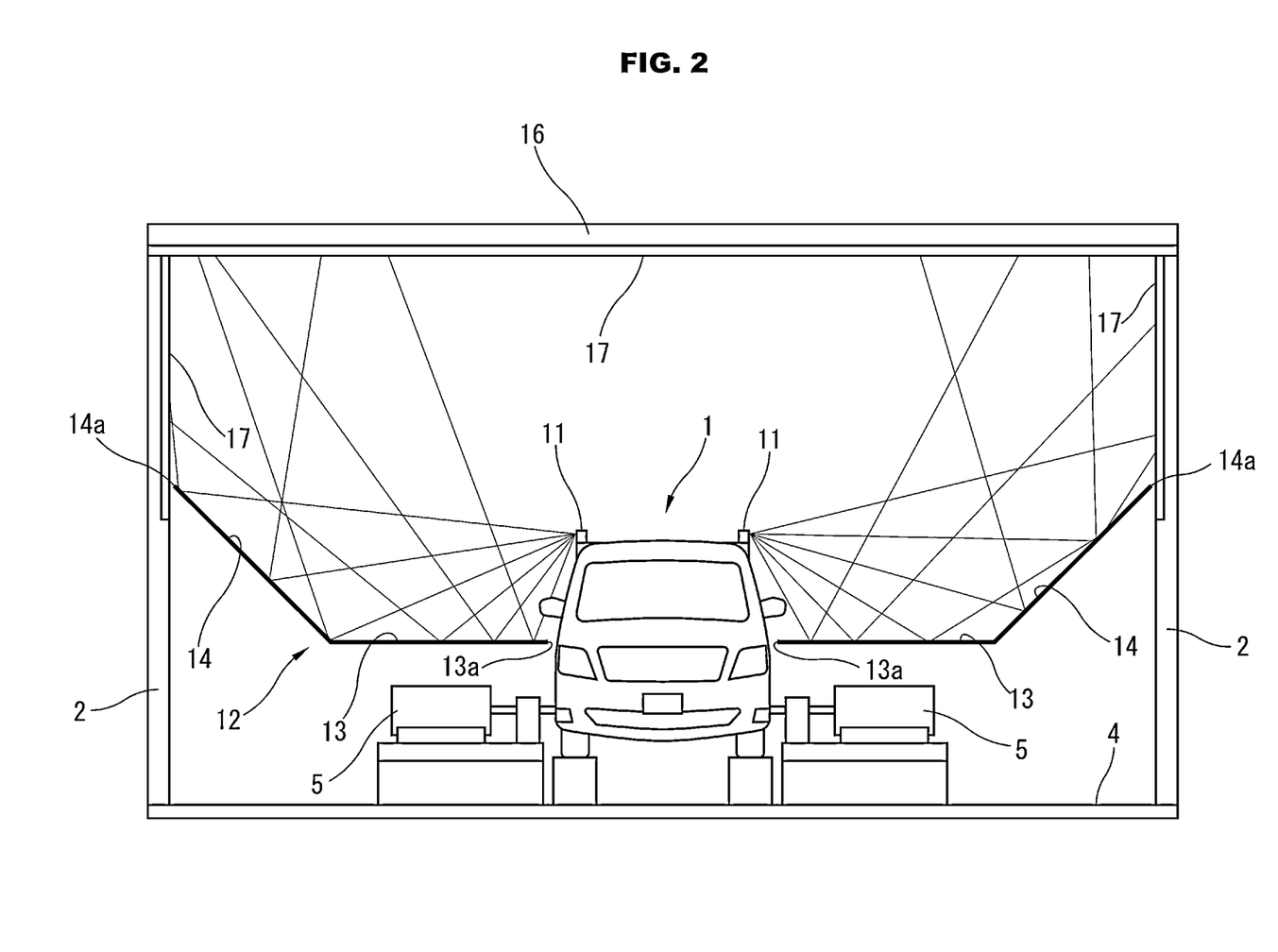
FIG. 2 is a cross sectional view along a line A-A in FIG. 1.

FIG. 1 is a plan view showing configurations of an interior of an inspection room according to a first embodiment. FIG. 2 is a cross sectional view along a line A-A shown in FIG. 1. As shown in these drawings, the inspection room is a rectangular room in which a test vehicle 1 is centered in plan view to be a target of a bench test. The inspection room includes side walls 2 surrounding a right side, a left side, and a rear side of test vehicle 1, and is open in a front side of test vehicle 1 for carrying in and out test vehicle 1, implementing a detection test of an obstacle in front of test vehicle 1, etc. In another manner, the inspection room may include a large-sized openable door (not shown) in the front side of test vehicle 1.

The inspection room includes a floor 4 on which test instruments 5 are disposed. Test instruments 5 are, for example, dynamometers that are respectively connected to axles of front and rear wheels of test vehicle 1 and measure driving force and braking force. In the drawings, each of the right and left sides of test vehicle 1 is provided with two test instruments 5 (e.g., dynamometers). In some cases, test instruments 5 (e.g., dynamometers) are connected to only one of the front wheels and the rear wheels depending on contents of a test. In addition, test instruments 5 in the present invention are not limited to dynamometers.

Test vehicle 1 includes LiDAR devices 11 disposed at a central part of a roof thereof in a front-and-rear direction. In detail, a right-and-left pair of LiDAR devices 11 are disposed respectively adjacently to side edges of the roof. LiDAR devices 11 are structured to detect an obstacle and measure a distance to it by radiating laser light so as to scan a wide region and then receiving light reflected by the obstacle. LiDAR devices are called also as LADARs in general. In the present embodiment, LiDAR devices 11 are positioned higher than test instruments 5. With no countermeasure, LiDAR devices 11 may recognize test instruments 5 as obstacles and cause test vehicle 1 to be controlled to a state unable to travel, because the scanning with laser light is performed not only in the vehicle front-and-rear direction but also in a vertical direction.

To avoid such detection of test instruments 5 by LiDAR devices 11, the inspection room according to the first embodiment is provided with a mirror unit 12. As shown in FIG. 2, mirror unit 12 is composed of first plane mirrors 13 and second plane mirrors 14. First plane mirrors 13 are arranged along a horizontal plane so as to surround test vehicle 1. Second plane mirrors 14 are arranged at inclined attitudes along an outer periphery of first plane mirrors 13. Thus, first plane mirrors 13 and second plane mirrors 14 are combined to be continuous with each other as if bent. As described below, first plane mirrors 13 and second plane mirrors 14 have lengths and angles set so as to guide laser light from LiDAR devices 11 toward a ceiling of the inspection room.

As shown in FIG. 2, first plane mirrors 13 form an inner peripheral edge 13a extending to face test vehicle 1, and are positioned at a height between LiDAR devices 11 and test instruments 5 so as to cover test instruments 5 from lines of sight of LiDAR devices 11. Inner peripheral edge 13a is close to side faces of test vehicle 1 sufficiently to hide test instruments 5 from LiDAR devices 11.

Second plane mirrors 14 are arranged to be inclined with respect to the horizontal plane, and form an outer peripheral edge 14a extending to face side walls 2. Outer peripheral edge 14a may be appropriately distant from inner faces of side walls 2, but is positioned at least higher than LiDAR devices 11. In other words, second plane mirrors 14 cover the inner faces of side walls 2 from lines of sight of LiDAR devices 11, to a height higher than LiDAR devices 11.

The ceiling of the inspection room includes a ceiling wall 16. Ceiling wall 16 includes an inner face (i.e., a lower face) to which a light absorber 17 for absorbing laser light from LiDAR devices 11 is stuck so as to cover an entire surface of ceiling wall 16. Light absorber 17 is selected to have characteristics in view of a wavelength of the laser light, and may be, for example, a light absorber with a flat surface or a light absorber with a uneven surface.

Similarly, other light absorbers 17 are disposed to cover wall surfaces of inner top areas of side walls 2 continuous to ceiling wall 16: in detail, upper areas that are not hidden by outer peripheral edge 14a of second plane mirrors 14 but exposed when viewed from LiDAR devices 11.

Thins lines in FIG. 2 represent optical paths of laser light reflected by mirror unit 12.

As shown in FIG. 1, mirror unit 12 surrounds three sides (i.e., the right, left, and rear sides) of test vehicle 1 except for the front side. The front side is open with no mirror because of necessity for allowing LiDAR devices 11 to detect an obstacle imitating a pedestrian etc. upon a test on automatic braking performance. Thus, mirror unit 12 is substantially U-shaped in plan view. The mirror in the rear side may be omitted in case of absence of test instrument 5 to be hidden.

Figure 3:
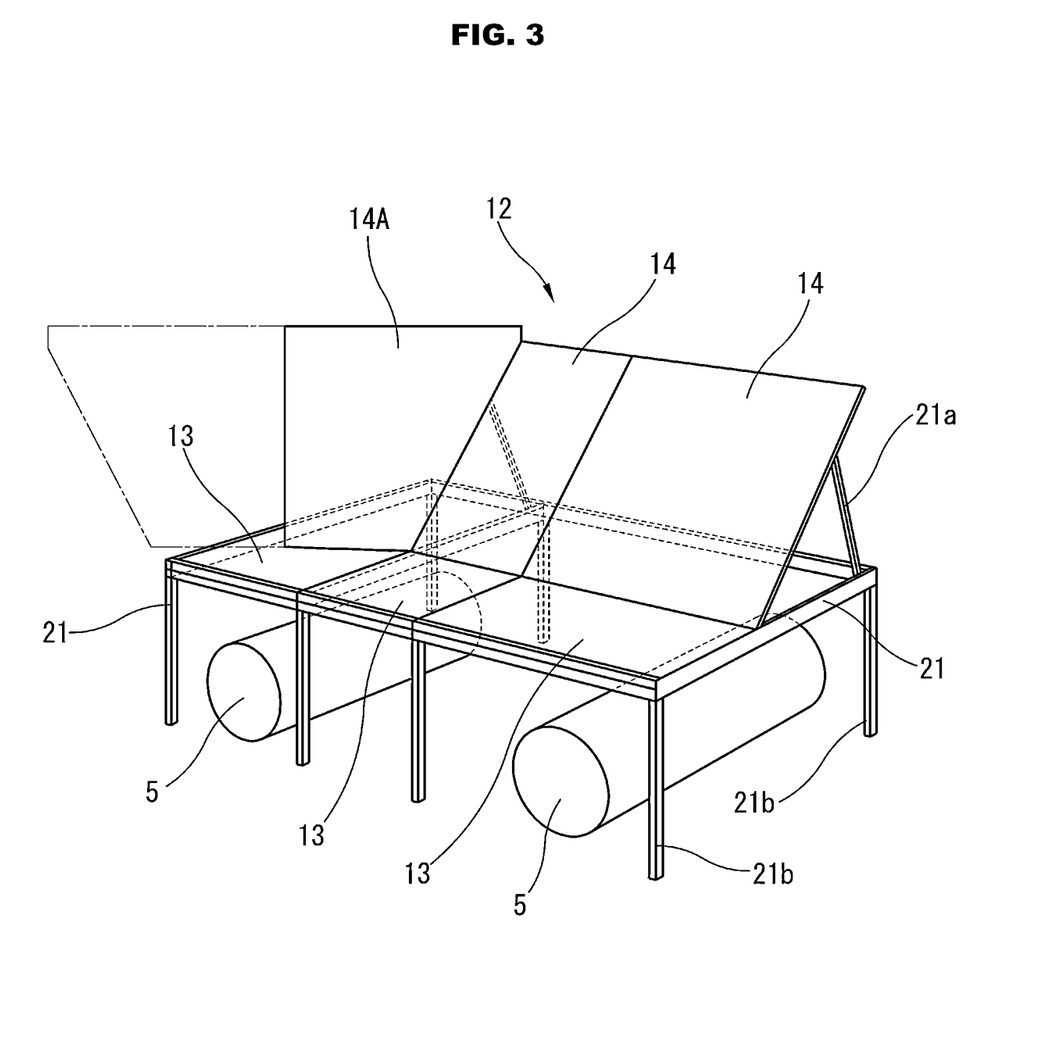
FIG. 3 is a perspective view showing configurations of a mirror unit composed of plane mirrors.

As shown in FIG. 3, second plane mirrors 14 include second plane mirrors 14A at both ends of mirror unit 12 in the vehicle front-and-rear direction, i.e., at four corners of the rectangular inspection room. Each of second plane mirrors 14A is inclined to be directed toward the center of the inspection room in plan view of the inspection room. Thus, the mirrors at the four corners have mirror planes directed inwardly such that an entire of mirror unit 12 approaches a parabola mirror in shape.

FIG. 3 shows more detailed configurations of mirror unit 12. As shown in the drawing, mirror unit 12 is composed of a plurality of sections divided in a longitudinal direction of the U shape, and includes frames 21 corresponding to the sections. Each of frames 21 is made up of metallic channel materials, and has a shape of a table. Frames 21 include upper faces to which first plane mirrors 13 divided corresponding to the sections are mounted. Second plane mirrors 14 are mounted to the upper faces of frames 21 so as to obliquely rise therefrom, and are supported from behind by beams 21a obliquely extending from frames 21. Each of first plane mirrors 13 and second plane mirrors 14 is formed by, for example, applying mirror finish to one surface of a flat metallic plate. First plane mirrors 13 and second plane mirrors 14 are disposed in contact with each other so as to eliminate gaps at boundaries therebetween to the extent possible. Each of second plane mirrors 14A at the four corners described above is shaped trapezoidal in view of an angle to face inwardly, so as to be continuous with both of adjacent second plane mirrors 14 without a gap. Incidentally, FIG. 3 shows only a part of mirror unit 12 that is substantially U-shaped as the entire.

As schematically shown in FIG. 3, test instruments 5 are contained in inner spaces of frames 21 of mirror unit 12. Frames 21 composed of a plurality of units include legs 21b that project downwardly from the upper faces independently from each other. This allows mirror unit 12 to be installed by putting frames 21 from above over test instruments 5 that have been installed beforehand on the floor of the inspection room.

According to the above configurations of the first embodiment, laser light emitted from LiDAR devices 11 is reflected by mirror unit 12 and guided toward the ceiling, and finally absorbed by light absorbers 17 on ceiling wall 16 and the top areas of side walls 2. The first embodiment is configured to secure long distances required for laser light reaching from LiDAR devices 11 to light absorbers 17, and also long distances required for laser light returning from a spot(s) in light absorber(s) 17 hit by the laser light to LiDAR devices 11. This causes attenuation of light by distance, and thereby suppresses LiDAR devices 11 from detecting scattering of light in light absorbers 17 if it occurs to some extent, and suppresses LiDAR devices 11 from recognizing test instruments 5 as obstacles.

Figure 4:
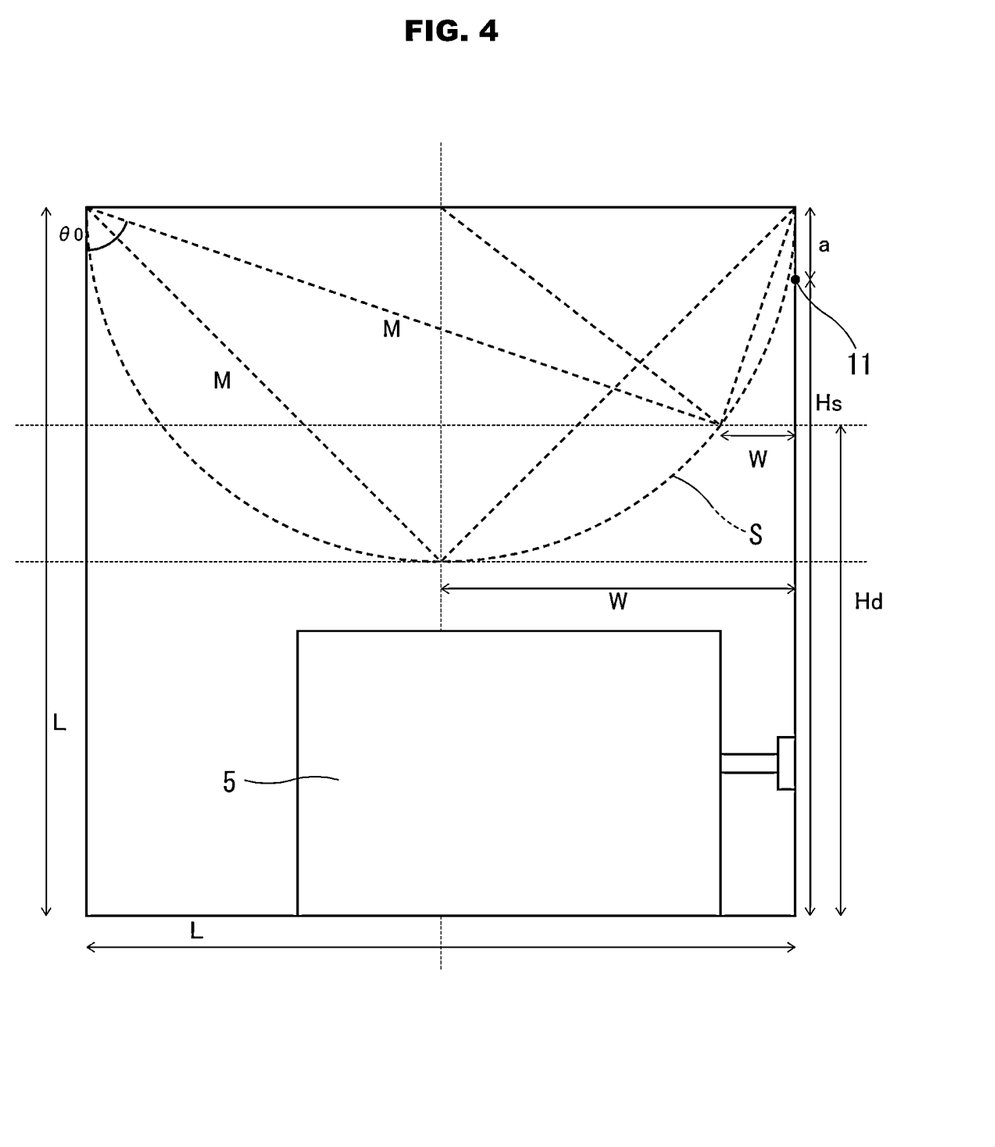
FIG. 4 is an illustrative view showing relations among lengths and angles of two groups of plane mirrors.

The following describes a length of first plane mirrors 13, a length of second plane mirrors 14, and an angle of second plane mirrors 14 required for obtaining the above effects, with reference to FIG. 4.

FIG. 4 schematically shows a cross section in the vertical direction in one side of test vehicle 1. Reference character L in the drawing represents the height position of outer peripheral edge 14a of second plane mirrors 14. Height position L is set to a height Hs+a, where Hs represents a height of LiDAR devices 11, and "a" represents an appropriate margin.

It is desirable that mathematical formulas (1), (2), and (3) below are satisfied where: W represents the length of first plane mirrors 13; Hd represents the height position at which first plane mirrors 13 is disposed; M represents the length of second plane mirrors 14; θ0 represents the inclination angle of second plane mirrors 14 with respect to a vertical plane.

$$W = L/2 * (1 + \cos(2*\theta 0)) \quad (1)$$

$$Hd = L * (1 - \sin(2*\theta 0)/2) \quad (2)$$

$$M = L * \sin \theta 0 \quad (3)$$

When these relations are satisfied, the boundary (i.e., a bent point) between first plane mirror 13 and second plane mirror 14 is always positioned on an arc of a circle S shown in FIG. 4. FIG. 4 shows two examples of a combination of first plane mirrors 13 and second plane mirrors 14 that satisfies the above relations. In both of the combination examples, optical paths of laser light emitted from LiDAR devices 11 in any directions are directed toward the ceiling or a region above height L of side walls 2. This eliminates optical paths returning to LiDAR devices 11, because of angles of incidence of the laser light into the ceiling or side walls 2. For example, laser light incident on side walls 2 is, even if reflected by side walls 2, directed to the ceiling and fails to return to LiDAR devices 11.

It is unfavorable to set the margin "a" to 0 because laser light incident perpendicularly on side walls 2 may return to LiDAR devices 11 in case that height L of outer peripheral edge 14a is equal to height Hs of LiDAR devices 11.

The configuration of combining two parts of first plane mirrors 13 (i.e., a first plane mirror part) and second plane mirrors 14 (i.e., a second plane mirror part) to achieve desired optical paths serves to simplify mirror unit 12 while reducing the number of boundaries between the two parts of plane mirrors that are likely to cause scattering of light.

Figure 5:
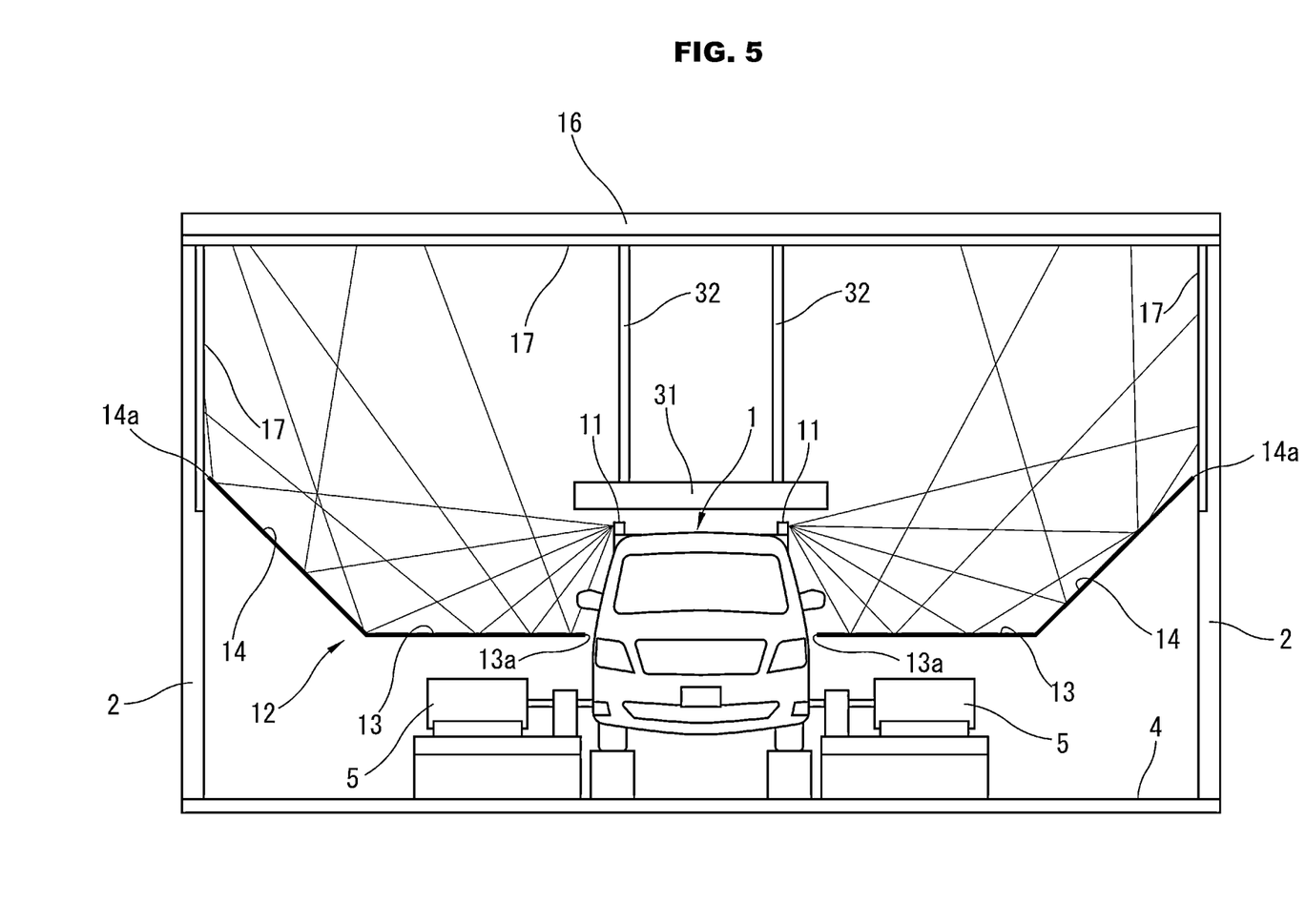
FIG. 5 is a cross sectional view according to a second embodiment including an intermediate ceiling wall.

FIG. 5 shows a second embodiment providing an intermediate ceiling wall 31 disposed above test vehicle 1 in the inspection room. Intermediate ceiling wall 31 is hung from ceiling wall 16 by support columns 32 so as to be positioned between ceiling wall 16 and test vehicle 1 and cover LiDAR devices 11 from above. Intermediate ceiling wall 31 desirably has a size sufficient to interrupt optical paths from the entire area of ceiling wall 16 toward LiDAR devices 11. Intermediate ceiling wall 31 includes an upper face covered by a light absorber similar to the ones described above. Furthermore, another light absorber(s) may be disposed also on a lower face and/or side faces of intermediate ceiling wall 31, for suppression of stray light.

These configurations prevent laser light from reaching LiDAR devices 11 even in case of reflection or scattering of the laser light on ceiling wall 16. Specifically, intermediate ceiling wall 31 interrupts laser light reflected or scattered on ceiling wall 16 and/or top areas of side walls 2 and directed toward LiDAR devices 11.

In the second embodiment, laser light from LiDAR devices 11 is not directly incident on intermediate ceiling wall 31 because LiDAR devices 11 have scan areas relatively small in maximum angle.

Figure 6:
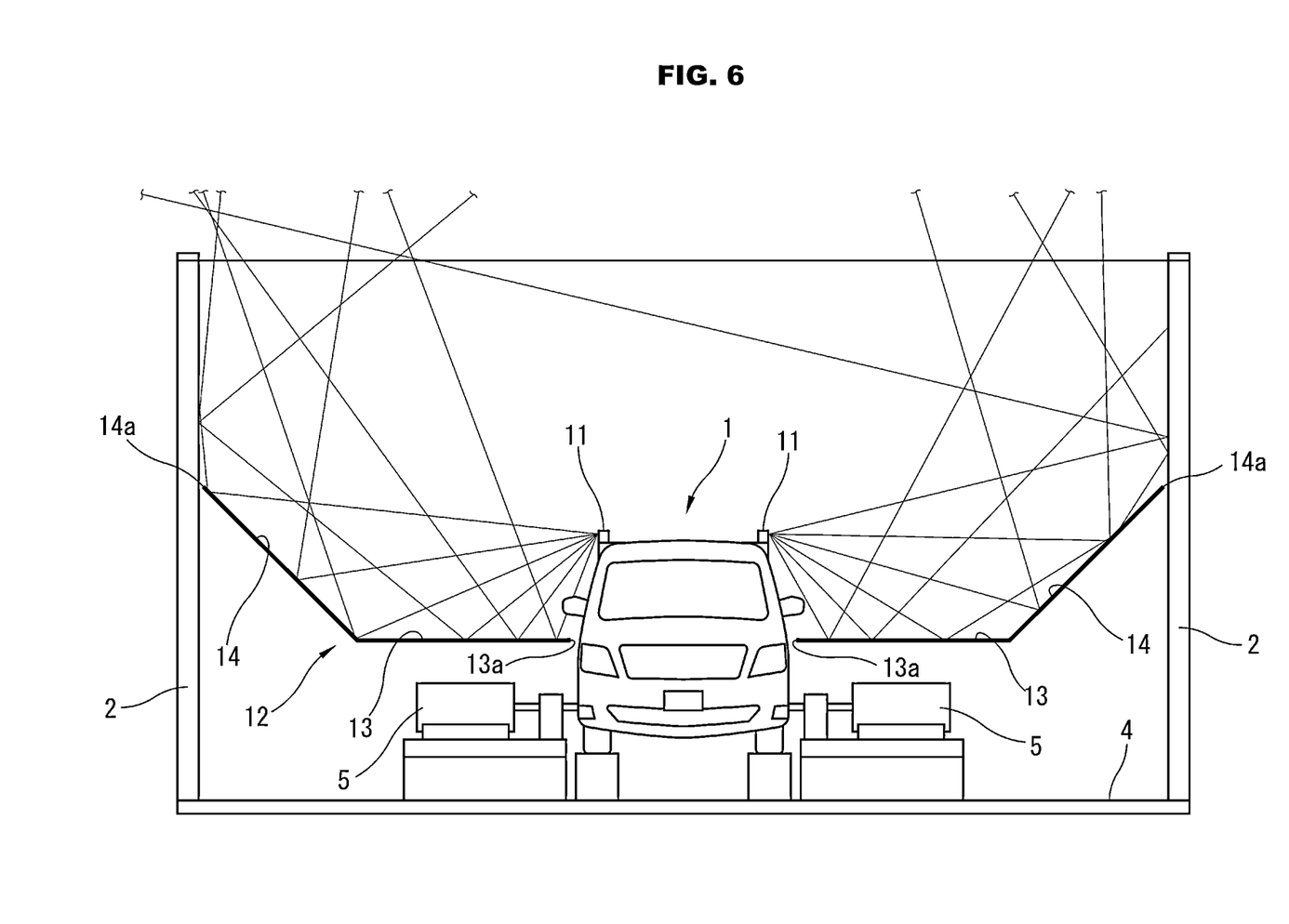
FIG. 6 is a cross sectional view according to a third embodiment in which a ceiling is open.

FIG. 6 shows a third embodiment in which the ceiling of the inspection room is open. In the third embodiment, laser light reflected on mirror unit 12 and guided toward the ceiling travels to outside without being interrupted. Thus, laser light does not return to LiDAR devices 11. In addition, side walls 2 according to the third embodiment are not provided with light absorbers 17 on their top areas. Provided that the relations (1), (2), and (3) described above are satisfied, LiDAR devices 11 are not affected by laser light because laser light reflected on side walls 2 is directed toward the open ceiling.

In another manner, the ceiling of the inspection room may include an openable ceiling wall and be open during a test.

The above details the embodiments of the present invention with reference to the drawings. However, the present invention is not limited to the above embodiments, but may be variously modified. For example, the arrangement of LiDAR devices 11 in test vehicle 1 is not limited to the arrangement on the both side edges of the roof as exemplified in the embodiment, but may be any arrangement. Furthermore, mirror unit 12 may be composed of three parts of plane mirrors, and/or may include curved mirrors.

Each of the first to third embodiments is configured to guide laser light reflected on mirror unit 12 toward the ceiling. However, in case of an inspection room sufficiently long in distance to side walls 2, it is allowed to configured such that laser light reflected on mirror unit 12 is directed to side walls 2.

The invention claimed is:

1. A vehicle inspection device for implementing a test on automatic braking performance of a test vehicle including an optical laser device for obstacle detection, in an inspection room three sides of which are surrounded by side walls, the vehicle inspection device comprising:
   a test instrument disposed at a side of the test vehicle; and
   a mirror unit that covers an upper face of the test instrument and upwardly guides light emitted from the optical laser device,
   wherein:
      the mirror unit includes an inner peripheral edge that extends to face the test vehicle and is positioned at a height between the optical laser device and the test instrument;
      the mirror unit includes an outer peripheral edge that extends to face the side walls and is positioned at a height higher than the optical laser device; and
      the mirror unit is curved or bent so as to guide light emitted from the optical laser device, toward a ceiling of the inspection room.

2. The vehicle inspection device as claimed in claim 1, wherein the ceiling of the inspection room includes an inner face covered by a light absorber.

3. The vehicle inspection device as claimed in claim 2, wherein:
   the optical laser device is covered from above by an intermediate ceiling wall hung between the test vehicle and the ceiling of the inspection room; and
   the intermediate ceiling wall includes an upper face covered by a light absorber.

4. The vehicle inspection device as claimed in claim 1, wherein the ceiling of the inspection room is open.

5. The vehicle inspection device as claimed in claim 1, wherein the mirror unit is composed of a plurality of plane mirrors.

6. The vehicle inspection device as claimed in claim 5, wherein when viewed at a vertical cross section at one side of the test vehicle, the mirror unit includes a combination of: a first plane mirror part that includes the inner peripheral edge of the mirror unit and is disposed horizontally; and a second plane mirror part that includes the outer peripheral edge of the mirror unit and is disposed to be inclined.

7. The vehicle inspection device as claimed in claim 6, wherein relations of $$W = L/2 * (1 + \cos(2*\theta 0))$$

$$Hd = L * (1 - \sin(2*\theta 0)/2)$$

$$M = L * \sin \theta 0$$

are satisfied, where: L represents a height position of the outer peripheral edge of the mirror unit that is a sum Hs+a0 of a height position Hs of the optical laser device and a margin a0; W represents a length of the first plane mirror part; Hd represents a height position of the first plane mirror part; M represents a length of the second plane mirror part; and θ0 represents an inclination angle of the second plane mirror part with respect to a vertical plane.

8. The vehicle inspection device as claimed in claim 1, wherein the test instrument is a dynamometer structured to be connected to an axle of the test vehicle and measure a driving force.

* * * * *